United States Patent
Wietfeldt

(10) Patent No.: US 9,934,190 B2
(45) Date of Patent: Apr. 3, 2018

(54) DYNAMIC INTERFACE MANAGEMENT FOR INTERFERENCE MITIGATION

(71) Applicant: QUALCOMM Incorporated, San Diego, CA (US)

(72) Inventor: Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 14/736,434

(22) Filed: Jun. 11, 2015

(65) Prior Publication Data

US 2016/0364359 A1   Dec. 15, 2016

(51) Int. Cl.
*G06F 13/42* (2006.01)
*G06F 13/36* (2006.01)
(Continued)

(52) U.S. Cl.
CPC .......... *G06F 13/4265* (2013.01); *G06F 13/36* (2013.01); *G06F 13/38* (2013.01);
(Continued)

(58) Field of Classification Search
CPC ...... G06F 13/36; G06F 13/38; G06F 13/4265; G06F 15/02; G06F 15/163; H04L 12/4013; H04B 15/02
See application file for complete search history.

(56) References Cited

U.S. PATENT DOCUMENTS

| 5,223,806 A | 6/1993 | Curtis et al. |
| 7,555,016 B2 | 6/2009 | Page |

(Continued)

FOREIGN PATENT DOCUMENTS

| WO | 03096638 A2 | 11/2003 |
| WO | 2013133933 A1 | 9/2013 |

OTHER PUBLICATIONS

Second Written Opinion for PCT/US2016/032384, dated May 10, 2017, 8 pages.
(Continued)

*Primary Examiner* — Nimesh G Patel
(74) *Attorney, Agent, or Firm* — Withrow & Terranova, PLLC

(57) ABSTRACT

Dynamic interface management for interference mitigation is disclosed. In one aspect, an integrated circuit (IC) is provided that employs a control system configured to mitigate electromagnetic interference (EMI) caused by an aggressor communications bus. The control system is configured to receive information related to EMI conditions and adjust a data/clock mode of an interface corresponding to the aggressor communications bus. In this manner, the interface is configured to couple to the aggressor communications bus. The interface is configured to transmit signals to and receive signals from the aggressor communications bus. The control system is configured to use the information related to the EMI conditions to set the data/clock mode of the interface to mitigate the EMI experienced by a victim receiver. Thus, the control system provides designers with an additional tool that may reduce performance degradation of the victim receiver attributable to EMI.

30 Claims, 8 Drawing Sheets

(51) Int. Cl.
*G06F 13/38* (2006.01)
*G06F 15/163* (2006.01)
*H04B 15/02* (2006.01)
*H04L 12/40* (2006.01)

(52) U.S. Cl.
CPC ........... *G06F 15/163* (2013.01); *H04B 15/02* (2013.01); *H04L 12/4013* (2013.01)

(56) References Cited

U.S. PATENT DOCUMENTS

| | | | | |
|---|---|---|---|---|
| 8,626,102 | B1* | 1/2014 | Bidichandani | H04B 1/3805 455/164.2 |
| 9,680,523 | B1* | 6/2017 | Gagnon | H04B 1/69 |
| 2006/0093147 | A1* | 5/2006 | Kwon | H04L 25/03866 380/268 |
| 2013/0120037 | A1 | 5/2013 | Tripathi et al. | |
| 2014/0269954 | A1 | 9/2014 | Whitby-Strevens | |
| 2014/0269972 | A1 | 9/2014 | Rada et al. | |
| 2014/0301279 | A1 | 10/2014 | Cheruel | |
| 2015/0171842 | A1* | 6/2015 | Cao | H03K 5/01 327/232 |
| 2016/0179741 | A1* | 6/2016 | Wietfeldt | G06F 13/4221 710/313 |
| 2016/0364363 | A1 | 12/2016 | Wietfeldt | |

OTHER PUBLICATIONS

Second Written Opinion for PCT/US2016/037008, dated May 10, 2017, 7 pages.
Vuagnoux M., et al., "Compromising Electromagnetic Emanations of Wired and Wireless Keyboards," Proceedings of the 18th conference on USENIX security symposium, Aug. 10-14, 2009, Montreal, Canada, pp. 1-50.
International Search Report and Written Opinion for PCT/US2016/032384, dated Sep. 28, 2016, 13 pages.
International Preliminary Report on Patentability for PCT/US2016/032384, dated Sep. 5, 2017, 22 pages.
International Preliminary Report on Patentability for PCT/US2016/037008, dated Sep. 1, 2017, 8 pages.

\* cited by examiner

US 9,934,190 B2

DYNAMIC INTERFACE MANAGEMENT FOR INTERFERENCE MITIGATION

BACKGROUND

I. Field of the Disclosure

The technology of the disclosure relates generally to electromagnetic interference (EMI), and particularly to mitigating effects of such EMI.

II. Background

Mobile computing devices, such as mobile phones and computer tablets, have become increasingly prevalent in contemporary society. These mobile computing devices commonly include multiple circuits that must operate concurrently for successful use of everyday functions. For example, a mobile computing device may be used to make phone calls or send e-mail messages via a wireless modem. The same mobile computing device may also perform other functions using function-specific circuits, such as taking pictures with an integrated camera or viewing a video on an integrated display.

In this regard, each function-specific circuit communicates with a central processor configured to execute instructions related to such functions. More specifically, data and clock signals are exchanged between each circuit and a central processor during function execution. As the frequency of such signals increases, a greater volume of electromagnetic emissions is generated at each clock edge. This increase in electromagnetic emissions causes electromagnetic interference (EMI) that degrades the performance of other circuitry within the mobile computing device.

Additionally, continued miniaturization of mobile computing devices, combined with increased frequencies, further exacerbates the effects of EMI. In particular, as the circuit area within a mobile computing device decreases, circuit elements are placed closer together. This closer proximity of circuit elements increases the effects of EMI generated by the greater electromagnetic emissions resulting from higher frequencies. EMI can also be generated by low frequency signals. Such low frequency signals typically generate EMI at direct or indirect harmonics of a low frequency signal, or may generate intermodulation products with other signals in the mobile computing device. Therefore, it would be advantageous to provide designers with additional tools to mitigate the effects of EMI within mobile computing devices as frequency ranges continue to increase while device sizes decrease.

SUMMARY OF THE DISCLOSURE

Aspects disclosed in the detailed description include dynamic interface management for interference mitigation. In one aspect, an integrated circuit (IC) is provided that employs a control system configured to mitigate electromagnetic interference (EMI) caused by an aggressor communications bus. The control system is configured to receive information related to EMI conditions and adjust a data/clock mode of an interface corresponding to the aggressor communications bus. In this manner, the interface is configured to couple to the aggressor communications bus. The interface is configured to transmit signals to and receive signals from the aggressor communications bus. The control system is configured to use the information related to the EMI conditions to set the data/clock mode of the interface to mitigate the EMI experienced by a victim receiver. Thus, the control system provides designers with an additional tool that may reduce performance degradation of the victim receiver attributable to EMI. In other words, EMI associated with signals on the aggressor communications bus may negatively affect the victim receiver. Mitigating EMI via the control system may improve the performance of the victim receiver, and thus improve metrics such as sound quality, image quality, and/or speed of operation.

In this regard in one aspect, an application processor is disclosed. The application processor comprises an interface. The interface is configured to couple to an aggressor communications bus. The interface is further configured to transmit one or more application processor signals to the aggressor communications bus. The interface is further configured to receive one or more transceiver signals from the aggressor communications bus. The application processor further comprises a control system. The control system is configured to receive information from a coexistence manager, the information related to EMI at a victim receiver as a result of the aggressor communications bus. The control system is further configured to process a determination of a data/clock mode of the interface that mitigates a performance impact corresponding to the EMI. The control system is further configured to set the data/clock mode of the interface to mitigate the EMI.

In another aspect, a method for mitigating EMI experienced by a victim receiver as a result of an aggressor communications bus is disclosed. The method comprises receiving information from a coexistence manager, the information related to EMI at a victim receiver as a result of an aggressor communications bus. The method further comprises processing a determination of a data/clock mode of an interface that mitigates a performance impact corresponding to the EMI. The method further comprises setting the data/clock mode of the interface to mitigate the EMI.

In another aspect, a transceiver is disclosed. The transceiver comprises an interface. The interface is configured to couple to an aggressor communications bus. The interface is further configured to transmit one or more transceiver signals to the aggressor communications bus. The interface is further configured to receive one or more application processor signals from the aggressor communications bus. The transceiver further comprises a control system. The control system is configured to receive information from a coexistence manager, the information related to EMI at a victim receiver as a result of the aggressor communications bus. The control system is further configured to process a determination of a data/clock mode of an interface that mitigates a performance impact corresponding to the EMI. The control system is further configured to set the data/clock mode of the interface to mitigate the EMI.

In another aspect, an application processor is disclosed. The application processor comprises a means for receiving information from a coexistence manager, the information related to EMI at a victim receiver as a result of an aggressor communications bus. The application processor further comprises a means for processing a determination of a data/clock mode of an interface that mitigates a performance impact corresponding to the EMI. The application processor further comprises a means for setting the data/clock mode of the interface to mitigate the EMI.

DETAILED DESCRIPTION

Figure 1:
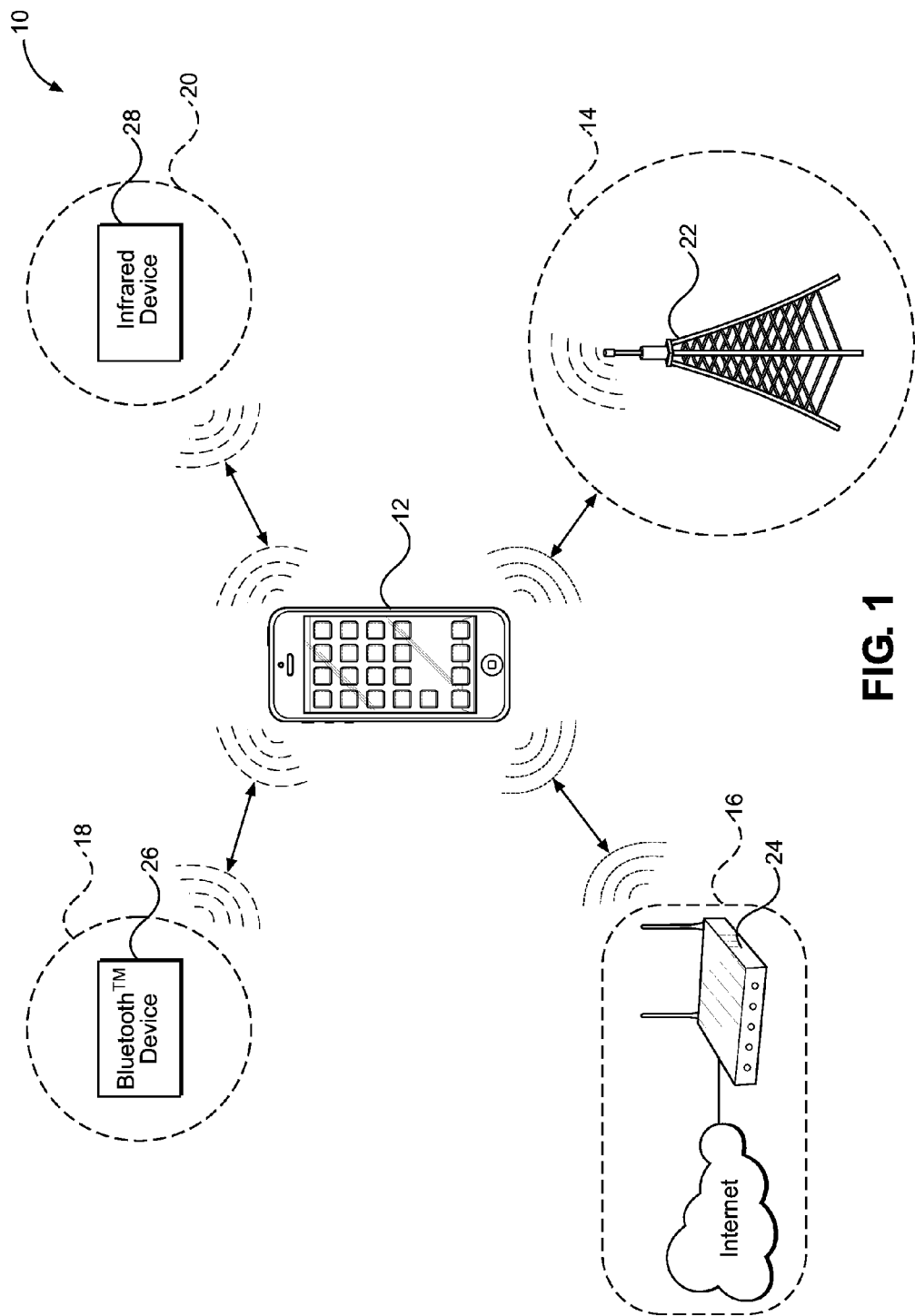
FIG. 1 is an illustration of an exemplary mobile computing device in a communications environment employing a plurality of networks.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include dynamic interface management for interference mitigation. In one aspect, an integrated circuit (IC) is provided that employs a control system configured to mitigate electromagnetic interference (EMI) caused by an aggressor communications bus. The control system is configured to receive information related to EMI conditions and adjust a data/clock mode of an interface corresponding to the aggressor communications bus. In this manner, the interface is configured to couple to the aggressor communications bus. The interface is configured to transmit signals to and receive signals from the aggressor communications bus. The control system is configured to use the information related to the EMI conditions to set the data/clock mode of the interface to mitigate the EMI experienced by a victim receiver. Thus, the control system provides designers with an additional tool that may reduce performance degradation of the victim receiver attributable to EMI. In other words, EMI associated with signals on the aggressor communications bus may negatively affect the victim receiver. Mitigating EMI via the control system may improve the performance of the victim receiver, and thus improve metrics such as sound quality, image quality, and/or speed of operation.

Before addressing exemplary aspects of the present disclosure, additional material is provided about the nature of EMI. In this regard, FIG. 1 illustrates a simplified diagram of an exemplary communications environment 10 that includes a mobile computing device 12 operating with a plurality of networks 14, 16, 18, and 20. The mobile computing device 12 communicates with each of the networks 14, 16, 18, and 20 separately, as the networks 14, 16, 18, and 20 each employ a different communications technology. For example, the network 14 includes a cellular base station 22 designed to support functions such as cellular phone and data communications with the mobile computing device 12. The network 16 is configured to support wireless fidelity ("Wi-Fi") communications, allowing the mobile computing device 12 to connect to other networks, such as the Internet, by way of a Wi-Fi router 24. The network 18 is configured to support Bluetooth™ technology, providing the mobile computing device 12 with the opportunity to communicate with a Bluetooth™-enabled device 26. Further, the network 20 supports communications within the infrared spectrum, thereby enabling the mobile computing device 12 to interact with an infrared device 28, such as a stereo receiver. To support such communications with the networks 14, 16, 18, and 20, the mobile computing device 12 includes circuit components individually configured to communicate with a particular communications technology. Notably, while the communications environment 10 includes the technologies and protocols associated with the networks 14, 16, 18, and 20, other technologies and protocols may exist.

Figure 2:
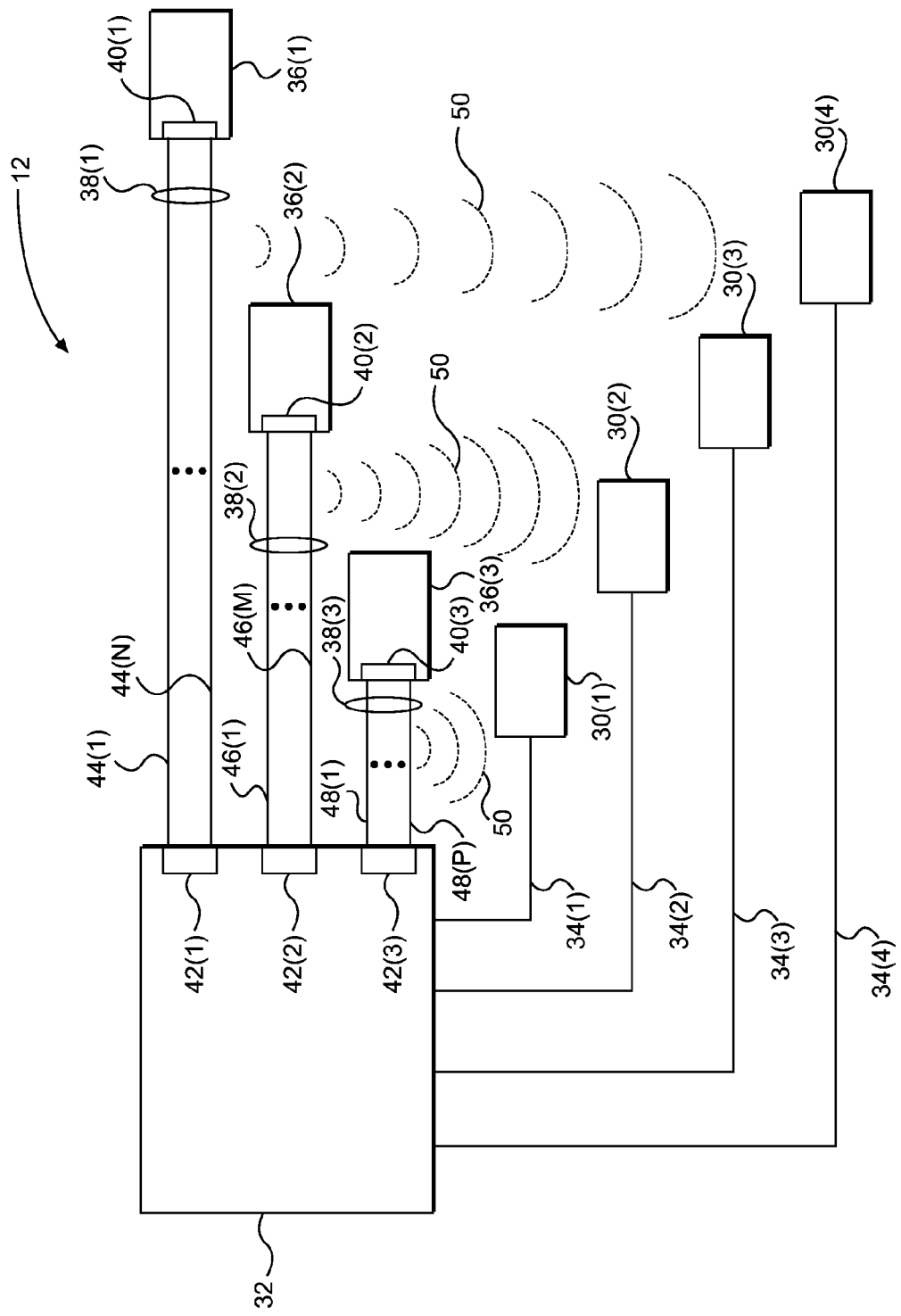
FIG. 2 is a simplified block diagram of internal circuitry of the mobile computing device of FIG. 1.

In this regard, FIG. 2 illustrates a simplified block diagram of the internal circuitry of the mobile computing device 12 of FIG. 1. More specifically, the mobile computing device 12 includes modems 30(1)-30(4), wherein each modem 30(1)-30(4) is configured to communicate with one of the networks 14, 16, 18, and 20, respectively, in FIG. 1. For example, the modem 30(1) is configured to conduct cellular communications with the network 14, while the modem 30(2) is configured to support Wi-Fi communications with the network 16. Further, the modem 30(3) supports communications via the Bluetooth™ protocol with the network 18, and the modem 30(4) provides infrared communications capability with the network 20. Each modem 30(1)-30(4) is coupled to an application processor 32 via a respective bus 34(1)-34(4), wherein the application processor 32 provides processing support for each of the respective modems 30(1)-30(4).

With continuing reference to FIG. 2, in addition to the modems 30(1)-30(4) that provide various communications capabilities, the mobile computing device 12 includes transceivers 36(1)-36(3). Each of the transceivers 36(1)-36(3) is incorporated into an element that enables the mobile computing device 12 to perform a corresponding non-modem-based function. For example, the transceiver 36(1) may be associated with a camera, thereby enabling the mobile computing device 12 to take photographs. Further, the transceiver 36(2) may be associated with a display that allows the mobile computing device 12 to display a video. The transceiver 36(3) may be associated with memory employed to store data necessary for the successful implementation of the functions within the mobile computing device 12. In addition to the examples described above, each transceiver 36(1)-36(3) may be associated with other functions that are well understood but not listed herein.

With continuing reference to FIG. 2, each transceiver 36(1)-36(3) is communicatively coupled to the application processor 32 via a corresponding aggressor communications bus 38(1)-38(3). In this regard, each aggressor communications bus 38(1)-38(3) couples to an interface 40(1)-40(3) in the corresponding transceiver 36(1)-36(3), and also couples to corresponding interfaces 42(1)-42(3) in the application processor 32. To achieve communications between the application processor 32 and each transceiver 36(1)-36(3), each aggressor communications bus 38(1)-38(3) includes multiple lanes configured to transfer clock and data signals (not shown) between each transceiver 36(1)-36(3) and the application processor 32. Thus, the aggressor communications bus 38(1) includes lanes 44(1)-44(N), the aggressor communications bus 38(2) includes lanes 46(1)-46(M), and the aggressor communications bus 38(3) includes lanes 48(1)-48(P). Notably, the modems 30(1)-30(4), the application processor 32, and the transceivers 36(1)-36(3) may be provided on separate chips, on a single system-on-a-chip (SoC), or a combination thereof. Thus, the buses 34(1)-34(4) and the aggressor communications buses 38(1)-38(3) may be internal or external to a SoC, depending on the implementation of the corresponding elements. Further, each aggressor communications bus 38(1)-38(3) may be configured to be compatible with a particular protocol, wherein the particular protocol of each aggressor communications bus 38(1)-38(3) determines which signals are assigned to the corresponding lanes 44(1)-44(N), 46(1)-46(M), and 48(1)-48(P). As a non-limiting example, the aggressor communications bus 38(1) may be a Peripheral Component Interconnect (PCI) bus. In this regard, as defined by the PCI standard, the names and uses of the pins of the aggressor communications bus 38(1) are summarized in TABLE 1 set forth below.

TABLE 1

Conventional PCI Standard-A Connector Pin Assignment and Mating Sequence

| Pin | Side B | Side A | Comments |
|---|---|---|---|
| 1 | +12 V | PRSNT1# | Pulled low to indicate card inserted |
| 2 | +12 V | +12 V | |
| 3 | +12 V | +12 V | |
| 4 | Ground | Ground | |
| 5 | SMCLK | TCK | SMBus and JTAG port pins |
| 6 | SMDAT | TDI | |
| 7 | Ground | TDO | |
| 8 | +3.3 V | TMS | |
| 9 | TRST# | +3.3 V | |
| 10 | +3.3 V aux | +3.3 V | Standby power |
| 11 | Wake# | PWRGD | Link reactivation, power good |
| | | | Key Notch |
| 12 | Reserved | Ground | |
| 13 | Ground | REFCLK+ | Reference clock differential pair |
| 14 | HSOp(0) | REFCLK− | Lane 0 transmit data + and − |
| 15 | HSOn(0) | Ground | |
| 16 | Ground | HSlp(0) | Lane 0 receive data + and − |
| 17 | PRSNT2# | HSln(0) | |
| 18 | Ground | Ground | |
| | | | End x1 connector |
| 19 | HSOp(1) | Reserved | Lane 1 transmit data + and − |
| 20 | HSOn(1) | Ground | |
| 21 | Ground | HSlp(1) | Lane 1 receive data + and − |
| 22 | Ground | HSln(1) | |
| 23 | HSOp(2) | Ground | Lane 2 transmit data + and − |
| 24 | HSOn(2) | Ground | |
| 25 | Ground | HSlp(2) | Lane 2 receive data + and − |
| 26 | Ground | HSln(2) | |
| 27 | HSOp(3) | Ground | Lane 3 transmit data + and − |
| 28 | HSOn(3) | Ground | |
| 29 | Ground | HSlp(3) | Lane 3 receive data + and − |
| 30 | Reserved | HSln(3) | |
| 31 | PRSNT2# | Ground | |
| 32 | Ground | Reserved | |
| | | | End x4 connector |
| 33 | HSOp(4) | Reserved | Lane 4 transmit data + and − |
| 34 | HSOn(4) | Ground | |
| 35 | Ground | HSlp(4) | Lane 4 receive data + and − |
| 36 | Ground | HSln(4) | |
| 37 | HSOp(5) | Ground | Lane 5 transmit data + and − |
| 38 | HSOn(5) | Ground | |
| 39 | Ground | HSlp(5) | Lane 5 receive data + and − |
| 40 | Ground | HSln(5) | |
| 41 | HSOp(6) | Ground | Lane 6 transmit data + and − |
| 42 | HSOn(6) | Ground | |
| 43 | Ground | HSlp(6) | Lane 6 receive data + and − |
| 44 | Ground | HSln(6) | |
| 45 | HSOp(7) | Ground | Lane 7 transmit data + and − |
| 46 | HSOn(7) | Ground | |
| 47 | Ground | HSlp(7) | Lane 7 receive data + and − |
| 48 | PRSNT2# | HSln(7) | |
| 49 | Ground | Ground | |
| | | | End x8 connector |
| 50 | HSOp(8) | Reserved | Lane 8 transmit data + and − |
| 51 | HSOn(8) | Ground | |
| 52 | Ground | HSlp(8) | Lane 8 receive data + and − |

TABLE 1-continued

Conventional PCI Standard-A Connector Pin Assignment and Mating Sequence

| Pin | Side B | Side A | Comments |
|---|---|---|---|
| 53 | Ground | HSln(8) | |
| 54 | HSOp(9) | Ground | Lane 9 transmit data + and − |
| 55 | HSOn(9) | Ground | |
| 56 | Ground | HSlp(9) | Lane 9 receive data + and − |
| 57 | Ground | HSln(9) | |
| 58 | HSOp(10) | Ground | Lane 10 transmit data + and − |
| 59 | HSOn(10) | Ground | |
| 60 | Ground | HSlp(10) | Lane 10 receive data + and − |
| 61 | Ground | HSln(10) | |
| 62 | HSOp(11) | Ground | Lane 11 transmit data + and − |
| 63 | HSOn(11) | Ground | |
| 64 | Ground | HSlp(11) | Lane 11 receive data + and − |
| 65 | Ground | HSln(11) | |
| 66 | HSOp(12) | Ground | Lane 12 transmit data + and − |
| 67 | HSOn(12) | Ground | |
| 68 | Ground | HSlp(12) | Lane 12 receive data + and − |
| 69 | Ground | HSln(12) | |
| 70 | HSOp(13) | Ground | Lane 13 transmit data + and − |
| 71 | HSOn(13) | Ground | |
| 72 | Ground | HSlp(13) | Lane 13 receive data + and − |
| 73 | Ground | HSln(13) | |
| 74 | HSOp(14) | Ground | Lane 14 transmit data + and − |
| 75 | HSOn(14) | Ground | |
| 76 | Ground | HSlp(14) | Lane 14 receive data + and − |
| 77 | Ground | HSln(14) | |
| 78 | HSOp(15) | Ground | Lane 15 transmit data + and − |
| 79 | HSOn(15) | Ground | |
| 80 | Ground | HSlp(15) | Lane 15 receive data + and − |
| 81 | PRSNT2# | HSln(15) | |
| 82 | Reserved | Ground | |

In this regard, with reference to TABLE 1, pin 13 in the PCI protocol, which corresponds to the lane 44(N) on the aggressor communications bus 38(1) in this example, is configured to transfer a clock signal. Further, pins 14-15 in the PCI protocol are configured to transmit data signals associated with a "Lane 0," which corresponds to the lane 44(1) on the aggressor communications bus 38(1) in this example. Additionally, pins 16-17 in the PCI protocol are configured to receive data signals associated with the "Lane 0," corresponding to the lane 44(1). Notably, each aggressor communications bus 38(1)-38(3) may be employed using various protocols. In this manner, as non-limiting examples, each aggressor communications bus 38(1)-38(3) may be employed as a PCI Express (PCIe) bus, a SuperSpeed Universal Serial Bus Inter-Chip (SSIC) bus, or a Universal Flash Storage (UFS) bus, wherein the number of lanes N may be the same or different across protocols.

With continuing reference to FIG. 2, although the transceivers 36(1)-36(3) provide the mobile computing device 12 with a range of functionality, such circuitry may also degrade the performance of the modems 30(1)-30(4). In this regard, the clock and data signals transferred between each transceiver 36(1)-36(3) and the application processor 32 over each respective aggressor communications bus 38(1)-38(3) may be sources of interference for the modems 30(1)-30(4). Particularly at higher frequencies, these signals generate electromagnetic emissions 50 at each clock edge (not shown). Such electromagnetic emissions 50 cause EMI that degrades the operation of the modems 30(1)-30(4). For example, the EMI may alter the cellular, wireless, Bluetooth™, or infrared signals sent from and received by the modems 30(1)-30(4), respectively. Altering these signals may produce errors in the information exchanged between the modems 30(1)-30(4) and the corresponding networks 14, 16, 18, and 20, thus degrading performance. As non-limiting examples, such degradation in performance may include a reduction in sound quality, a reduction in image quality, and/or a decrease in speed of operation. Notably, in addition to negatively impacting the modems 30(1)-30(4), the electromagnetic emissions 50 may also degrade the operation of other components and/or sub-systems communicatively coupled to the application processor 32 not illustrated in FIG. 2. Such other components and/or subsystems may also be on separate chips, in an SoC, a peripheral, another electronic component having an interface to a bus, or a combination thereof.

Figure 3:
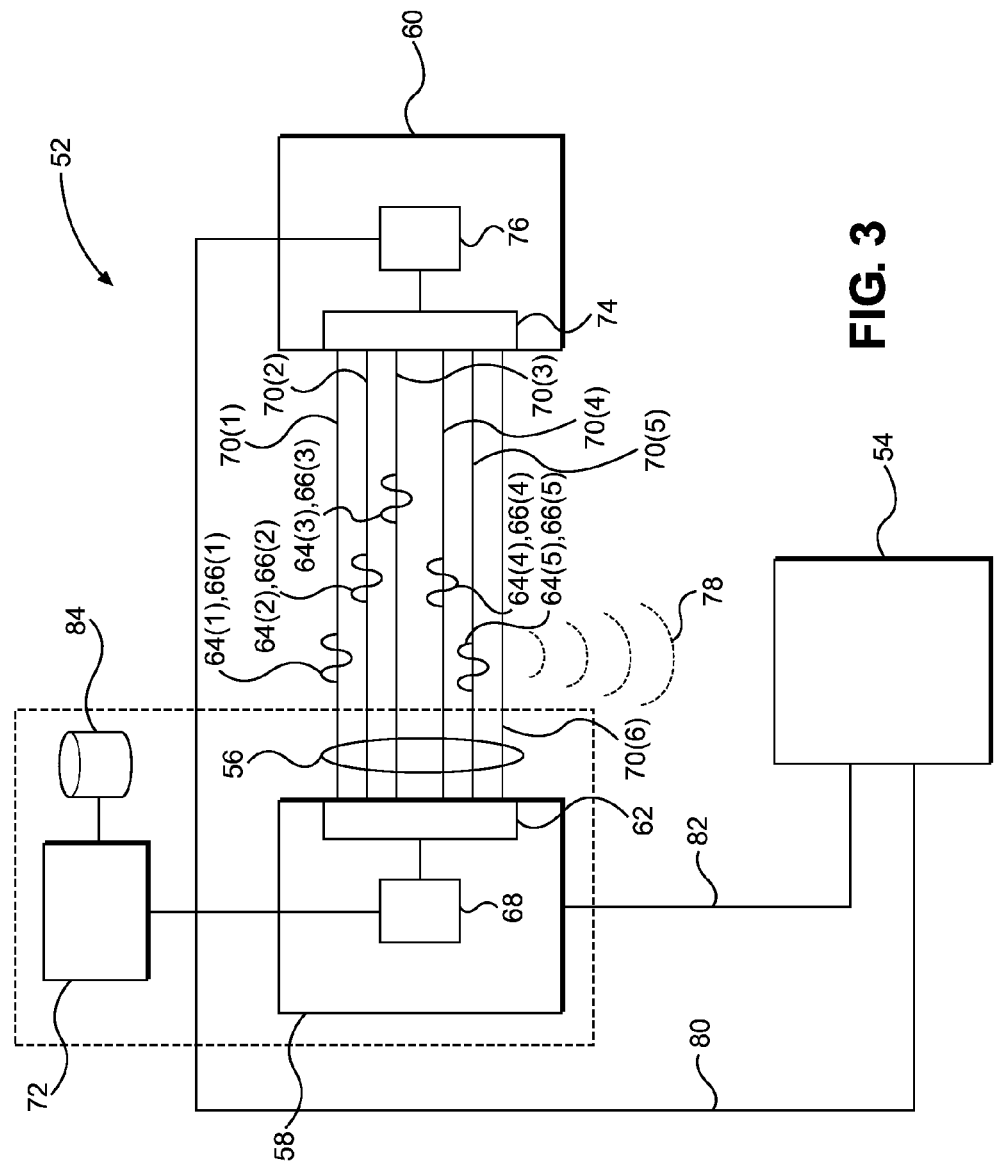
FIG. 3 is a block diagram of an exemplary computing device employing a control system configured to manage dynamically an interface corresponding to an aggressor communications bus to mitigate electromagnetic interference (EMI) experienced by a victim receiver.

In this regard, FIG. 3 illustrates an exemplary computing device 52 that employs dynamic interface management to mitigate EMI of a victim receiver 54 caused by an aggressor communications bus 56 within the computing device 52. In this aspect, the computing device 52 includes an application processor 58 communicatively coupled to a transceiver 60 via the aggressor communications bus 56. The application processor 58 includes an interface 62 configured to couple to the aggressor communications bus 56. The interface 62 is configured to transmit application processor signals 64(1)-64(5) to the aggressor communications bus 56, wherein the application processor signals 64(1)-64(5) are to be provided to the transceiver 60. Further, the interface 62 is configured to receive transceiver signals 66(1)-66(5) from the aggressor communications bus 56, wherein the transceiver signals 66(1)-66(5) are provided by the transceiver 60. The application processor 58 also includes a control system 68 configured to manage a data/clock mode associated with the interface 62 and lanes 70(1)-70(6) of the aggressor communications bus 56 based on information received from a coexistence manager 72, wherein the information is related to the EMI of the victim receiver 54.

With continuing reference to FIG. 3, the transceiver 60 includes an interface 74 configured to couple to the aggressor communications bus 56. The interface 74 employed by the transceiver 60 is configured to receive the application processor signals 64(1)-64(5) from the aggressor communications bus 56, and is also configured to transmit the transceiver signals 66(1)-66(5) to the aggressor communications bus 56. Similar to the application processor 58, the transceiver 60 includes a control system 76 configured to manage the data/clock mode associated with the interface 74 and the lanes 70(1)-70(6) of the aggressor communications bus 56. Notably, each of the control systems 68, 76 is sometimes referred to herein as a means for receiving information from the coexistence manager 72, the information related to EMI at the victim receiver 54 as a result of the aggressor communications bus 56. Further, each of the control systems 68, 76 is also sometimes referred to herein as a means for processing a determination of the data/clock mode of the interfaces 62, 74 that mitigates a performance impact corresponding to the EMI. Additionally, each of the control systems 68, 76 is sometimes referred to herein as a means for setting the data/clock mode of the interfaces 62, 74 to mitigate the EMI.

With continuing reference to FIG. 3, the application processor signals 64(1)-64(5) and the transceiver signals 66(1)-66(5) are transmitted between the application processor 58 and the transceiver 60 via the aggressor communications bus 56. Notably, the application processor signals 64(1)-64(5) and the transceiver signals 66(1)-66(5) may be data and/or clock signals, wherein each may have independent frequencies. As the application processor signals 64(1)-64(5) and the transceiver signals 66(1)-66(5) traverse across the aggressor communications bus 56, such signal activity generates electromagnetic emissions 78. The electromagnetic emissions 78 cause EMI that degrades the performance of the victim receiver 54. Further, in some aspects, activity associated with the interfaces 62, 74 may also contribute to the electromagnetic emissions 78.

With continuing reference to FIG. 3, in this aspect, the control systems 68, 76 employed by the application processor 58 and the transceiver 60, respectively, are configured to employ dynamic interface management to mitigate the EMI of the victim receiver 54. To achieve such dynamic interface management, each control system 68, 76 is configured to receive information related to the EMI of the victim receiver 54 caused by the aggressor communications bus 56. Using such information, the control systems 68, 76 are configured to process a determination of the data/clock mode of the interfaces 62, 74 that mitigates the performance impact corresponding to the EMI. The control systems 68, 76 are configured to use the processing of the determination to set the data/clock mode of the interfaces 62, 74 to mitigate the EMI and allow the victim receiver 54 to operate at or above an acceptable performance level.

With continuing reference to FIG. 3, the control systems 68, 76 may be configured to set the data/clock mode of the corresponding interfaces 62, 74 in various ways. In this manner, the control systems 68, 76 may be configured to set the data/clock mode by being configured to set a data rate of one or more of the lanes 70(1)-70(6). As a non-limiting example, to set the data rate, the control system 68 may be configured to multiplex the application processor signals 64(1)-64(5) associated with the lanes 70(1)-70(5), respectively, onto the lane 70(1). Notably, this example assumes binary signaling wherein no coding methods are employed to send more than one bit per clock period, and thus, the signaling corresponds to one bit per symbol per clock period. As described in further detail below, assuming that each application processor signal 64(1)-64(5) is transmitted at a data rate of N mega symbols per second (N Msym/s), the data rate of the lane 70(1) corresponds to the combined data rate of the multiplexed application processor signals 64(1)-64(5). Thus, multiplexing the application processor signals 64(1)-64(5) onto the lane 70(1) in this manner increases the data rate of the lane 70(1) to 5*N Msym/s.

Additionally, as a non-limiting example, to set the data rate, the control system 68 may be configured to demultiplex the application processor signal 64(1) associated with the lane 70(1) onto the lanes 70(1)-70(5). As described in further detail below, assuming that the application processor signal 64(1) is transmitted at a data rate of P Msym/s, the data rate of each lane 70(1)-70(5) corresponds to a divided data rate of the application processor signal 64(1). Thus, demultiplexing the application processor signal 64(1) onto the lanes 70(1)-70(5) in this manner decreases the data rate of each of the lanes 70(1)-70(5) to P/5 Msym/s. Notably, the control system 76 of the transceiver 60 may be configured to set the data/clock mode by being configured to set the data rate of one or more of the lanes 70(1)-70(6) similar to the control system 68 as described above. Setting the data rate corresponding to the interfaces 62, 74 in this manner may mitigate the EMI and allow the victim receiver 54 to operate at or above an acceptable performance level.

With continuing reference to FIG. 3, the control systems 68, 76 may also be configured to set the data/clock mode by being configured to set a data scrambling mode of the lanes 70(1)-70(6). As a non-limiting example, to set the data scrambling mode, the control system 68 may be configured to assign one or more data scrambling polynomial functions to one or more of the lanes 70(1)-70(6). Setting the data scrambling mode in this manner scrambles data signals corresponding to the application processor signals 64(1)-64(5). Notably, the control system 68 may assign different data scrambling polynomial functions to different lanes 70(1)-70(6) or different combinations of the lanes 70(1)-70(6). For example, the control system 68 may assign a first data scrambling polynomial function 51 to the lanes 70(1)-70(2), a second data scrambling polynomial function S2 to the lane 70(3), and a third data scrambling polynomial function S3 to the lanes 70(4)-70(6). Alternatively, the control system 68 may assign the first data scrambling polynomial function 51 to all of the lanes 70(1)-70(6). Notably, the control system 76 of the transceiver 60 may be configured to set the data/clock mode by being configured to set the data scrambling mode of the lanes 70(1)-70(6) similar to the control system 68 as described above. Setting the data scrambling mode corresponding to the interfaces 62, 74 in this manner may mitigate the EMI and allow the victim receiver 54 to operate at or above an acceptable performance level.

Similar to setting the data scrambling mode, the control systems 68, 76 may also be configured to set the data/clock mode by being configured to set a clock scrambling mode of the lanes 70(1)-70(6). As a non-limiting example, to set the clock scrambling mode, the control system 68 may be configured to assign one or more clock scrambling functions to one or more of the lanes 70(1)-70(6). Setting the clock scrambling mode in this manner scrambles clock signals corresponding to the application processor signals 64(1)-64(5). As non-limiting examples, the clock scrambling functions may relate to spread spectrum clocking or dithering. Notably, the control system 68 may assign different clock scrambling functions to different lanes 70(1)-70(6) or different combinations of the lanes 70(1)-70(6) similar to the data scrambling combinations described above. Further, the control system 76 of the transceiver 60 may be configured to set the data/clock mode by being configured to set the clock scrambling mode of the lanes 70(1)-70(6) similar to the control system 68 as described above. Setting the clock scrambling mode corresponding to the interfaces 62, 74 in this manner may mitigate the EMI and allow the victim receiver 54 to operate at or above an acceptable performance level.

With continuing reference to FIG. 3, the control systems 68, 76 may also be configured to set the data/clock mode by being configured to set a clock mode of the lanes 70(1)-70(6). As a non-limiting example, to set the clock mode of the lanes 70(1)-70(6), the control system 68 may be configured to set the clock mode associated with the interface 62 to a single data rate (SDR) mode, such as transmitting a data value on only one edge of a clock signal per clock period. Setting the clock mode in this manner sets clock signals corresponding to the application processor signals 64(1)-64(5) to the SDR mode. Additionally, the control system 68 may also be configured to set the clock mode associated with the interface 62 to a double data rate (DDR) mode, such as transmitting a data value on both a positive and a negative edge of a clock signal per clock period. Thus, setting the clock mode in this manner sets clock signals corresponding to the application processor signals 64(1)-64(5) to the DDR mode. Further, the control system 76 of the transceiver 60 may be configured to set the data/clock mode by being configured to set the clock mode of the lanes 70(1)-70(6) similar to the control system 68 as described above. Setting the clock mode corresponding to the interfaces 62, 74 in this manner may mitigate the EMI and allow the victim receiver 54 to operate at or above an acceptable performance level. Notably, setting the data/clock mode in aspects disclosed herein does not include setting or changing a frequency of the clock signals of the lanes 70(1)-70(6).

In this regard, employing dynamic interface management to set the data/clock mode of the interfaces 62, 74 as described above may be achieved in multiple aspects of the present disclosure. The details of such multiple aspects are now described. Notably, in the exemplary aspects described herein, the coexistence manager 72, the control system 68 of the application processor 58, the control system 76 of the transceiver 60, or a combination thereof, is configured to perform functions such as setting the data/clock mode. However, references to the application processor 58 or the transceiver 60 being configured to perform functions such as setting the data/clock mode are to be understood as referring to the control systems 68, 76, respectively, being configured to perform such functions. Further, in alternative aspects, other elements associated with the application processor 58 and the transceiver 60 may be configured to perform such functions. Additionally, although the exemplary aspects provided herein describe the victim receiver 54 as a wireless receiver, similar EMI mitigation results may be achieved in aspects employing the victim receiver 54 as a wired receiver.

With continuing reference to FIG. 3, in one exemplary aspect, the coexistence manager 72 is configured to determine the data/clock mode and communicate such information to the application processor 58. Further, the application processor 58 is configured to provide the data/clock mode information to the transceiver 60. In this manner, the coexistence manager 72 is configured to receive information indicating if the victim receiver 54 experiences EMI as a result of the aggressor communications bus 56. Notably, such information is provided via a bus 80 that communicatively couples the victim receiver 54 to the coexistence manager 72, wherein the victim receiver 54 is also communicatively coupled to the application processor 58 via a bus 82. The bus 80 also communicatively couples the coexistence manager 72 to the application processor 58 and the transceiver 60. The coexistence manager 72 is configured to use the information to determine an acceptable performance level of the victim receiver 54. Further, the coexistence manager 72 is configured to determine the data/clock mode associated with the interfaces 62, 74 of the application processor 58 and the transceiver 60, respectively, to which to set the interfaces 62, 74. In making such a determination, the coexistence manager 72 takes into account what data/clock mode will mitigate the EMI experienced by the victim receiver 54, while also allowing the victim receiver 54 to operate at or above the acceptable performance level. Further, in this aspect the coexistence manager 72 is configured to communicate with a database 84, wherein the database 84 is configured to store information related to the victim receiver 54 and its operation. As a non-limiting example, such information may include database entries (not shown) that correlate particular performance metrics of the victim receiver 54 to particular data/clock modes, wherein such information is accessed by the coexistence manager 72 via a look-up table (not shown) stored in the database 84.

With continuing reference to FIG. 3, in response to making the above determinations, the coexistence manager 72 is configured to provide information concerning the data/clock mode to the application processor 58. Such information includes the data/clock mode in which to set the interface 62. Further, the information includes the data/clock mode associated with the interface 74 in which the application processor 58 is to provide to the transceiver 60. Thus, in addition to setting the data/clock mode of the interface 62, the application processor 58 is configured to instruct the transceiver 60 of the data/clock mode in which to set the interface 74.

With continuing reference to FIG. 3, in another exemplary aspect, the application processor 58 is configured to determine the data/clock mode, as opposed to the coexistence manager 72 making the determination. Further, the application processor 58 is configured to provide the data/clock mode associated with the interface 74 to the transceiver 60. In this manner, rather than receiving the data/clock mode information as in the previously described aspect, the application processor 58 is configured to receive information from the coexistence manager 72 indicating if the victim receiver 54 experiences EMI as a result of the aggressor communications bus 56. Additionally, the application processor 58 is configured to receive information related to the acceptable performance level of the victim receiver 54. Using such information, the application processor 58 is configured to determine the data/clock mode associated with the interfaces 62, 74 of the application processor 58 and the transceiver 60, respectively, to which to set the interfaces 62, 74. In making this determination, the application processor 58 takes into account which data/clock mode will mitigate the EMI experienced by the victim receiver 54, while also allowing the victim receiver 54 to operate at or above the acceptable performance level. Thus, in addition to being configured to set the data/clock mode associated with the interface 62, the application processor 58 is configured to provide the data/clock mode in which to set the interface 74 to the transceiver 60.

With continuing reference to FIG. 3, in another exemplary aspect, the coexistence manager 72 is configured to determine the data/clock mode, and communicate such information directly to the application processor 58 and the transceiver 60. In this manner, the coexistence manager 72 is configured to receive information indicating if the victim receiver 54 experiences EMI as a result of the aggressor communications bus 56. The coexistence manager 72 is configured to use the information to determine an acceptable performance level of the victim receiver 54. Further, the coexistence manager 72 communicates to which data/clock mode of the application processor 58 and the transceiver 60 to set the interfaces 62, 74. In response to making the above determinations, the coexistence manager 72 is configured to provide information to the application processor 58 to set the data/clock mode of the interface 62. The coexistence manager 72 is also configured to provide information to the transceiver 60 concerning setting the data/clock mode of the interface 74.

With continuing reference to FIG. 3, in another exemplary aspect, the application processor 58 and the transceiver 60 are each configured to determine data/clock modes, as opposed to the coexistence manager 72 making the determination. In this manner, both the application processor 58 and the transceiver 60 are configured to receive information from the coexistence manager 72 indicating if the victim receiver 54 experiences EMI as a result of the aggressor communications bus 56. Additionally, the application processor 58 and the transceiver 60 are configured to receive information related to the acceptable performance level of the victim receiver 54. Using such information, the application processor 58 and the transceiver 60 are configured to determine the data/clock mode to which to set the interfaces 62, 74, respectively. In making this determination, the application processor 58 and the transceiver 60 take into account the data/clock mode that will mitigate the EMI experienced by the victim receiver 54, while also allowing the victim receiver 54 to operate at or above the acceptable performance level. Thus, in this aspect, the application processor 58 is configured to determine the data/clock mode in which to set the interface 62. Similarly, the transceiver 60 is configured to determine the data/clock mode in which to set the interface 74. Further, if the application processor 58 determines a data/clock mode that conflicts with the data/clock mode determined by the transceiver 60, an element such as the coexistence manager 72, the control system 68, the control system 76, or a combination thereof, may be configured to resolve such a conflict, if needed.

With continuing reference to FIG. 3, in another exemplary aspect, the coexistence manager 72 is configured to determine the data/clock mode, and communicate such information to the transceiver 60. The transceiver 60 is configured to provide the data/clock mode information to the application processor 58. In this manner, the coexistence manager 72 is configured to receive information indicating if the victim receiver 54 experiences EMI as a result of the aggressor communications bus 56. The coexistence manager 72 uses the information to determine an acceptable performance level of the victim receiver 54. The coexistence manager 72 is configured to determine the data/clock mode to which to set the interfaces 62, 74 of the application processor 58 and the transceiver 60, respectively. In making such a determination, the coexistence manager 72 takes into account which data/clock modes will mitigate the EMI experienced by the victim receiver 54, while also allowing the victim receiver 54 to operate at or above the acceptable performance level. In response to making the above determinations, the coexistence manager 72 is configured to provide information concerning the data/clock modes to the transceiver 60. Such information includes the data/clock mode in which to set the transceiver 60. Further, the information includes the data/clock mode in which the transceiver 60 is to instruct the application processor 58 to set the interface 62. Thus, in addition to setting the data/clock mode of the interface 74, the transceiver 60 is configured to instruct the application processor 58 of which data/clock mode to set the interface 62.

With continuing reference to FIG. 3, in another exemplary aspect, the transceiver 60 is configured to determine the data/clock mode, as opposed to the coexistence manager 72 making the determination. The transceiver 60 is configured to provide the data/clock mode information to the application processor 58. In this manner, rather than receiving the data/clock mode information, the transceiver 60 is configured to receive information from the coexistence manager 72 indicating if the victim receiver 54 experiences EMI as a result of the aggressor communications bus 56, and information related to the acceptable performance level of the victim receiver 54. Using such information, the transceiver 60 is configured to determine the data/clock mode in which to set the interface 62. In making this determination, the transceiver 60 takes into account which data/clock mode will mitigate the EMI experienced by the victim receiver 54, while also allowing the victim receiver 54 to operate at or above the acceptable performance level. Thus, in addition to being configured to set the data/clock mode of the interface 74, the transceiver 60 is configured to instruct the application processor 58 to set the data/clock mode of the interface 62.

With continuing reference to FIG. 3, the exemplary aspects previously described include the coexistence manager 72 employed remotely from the application processor 58. However, other aspects may achieve similar functionality when employing the coexistence manager 72 within the application processor 58. Additionally, the aspects disclosed herein may be employed using various protocols for the aggressor communications bus 56. In this manner, as non-limiting examples, the aggressor communications bus 56 may be employed as a PCI bus, a PCIe bus, an SSIC bus, or a UFS bus. Thus, employing the aspects disclosed herein provides designers with additional tools that may reduce the performance degradation of the victim receiver 54 attributable to EMI.

Figure 4A:
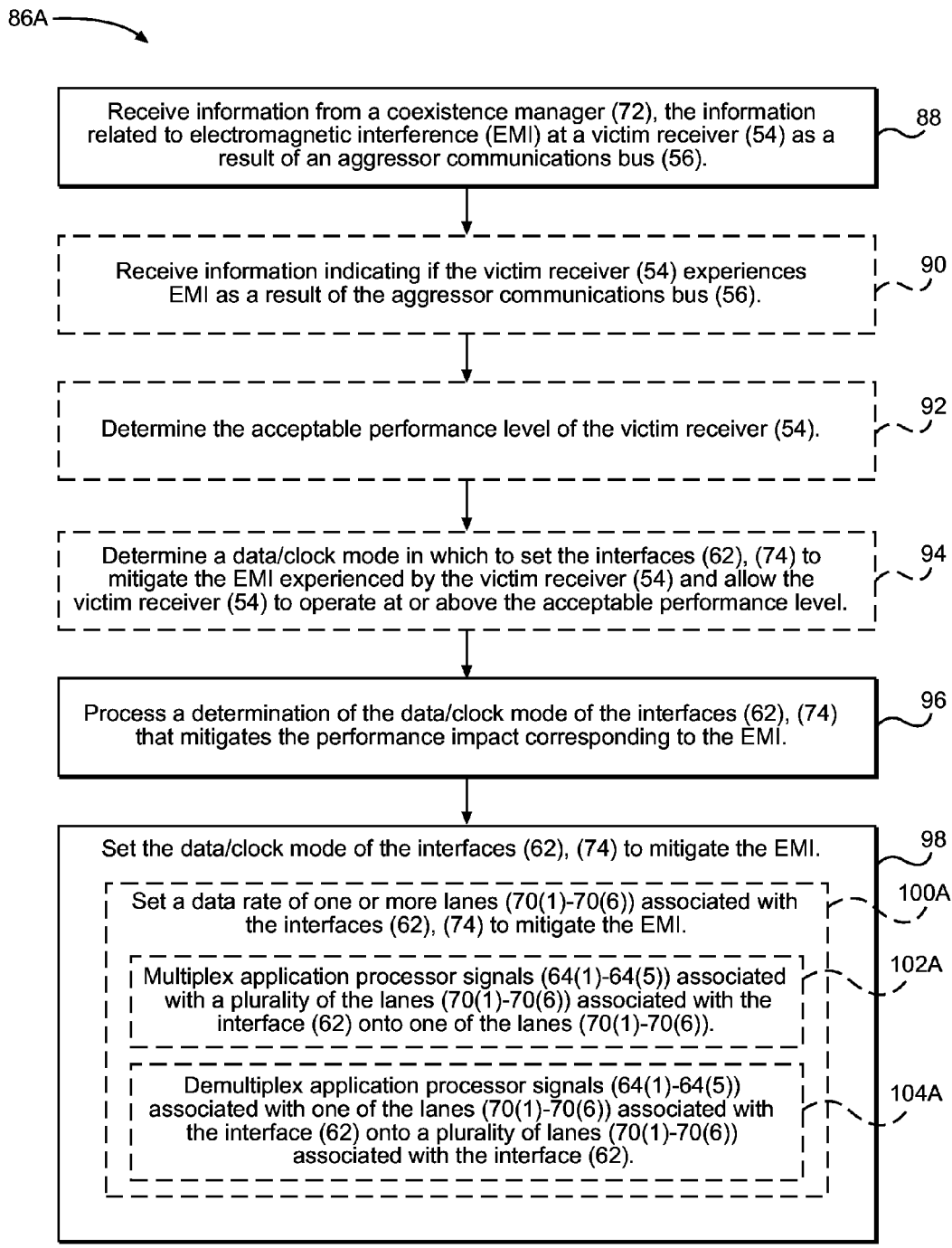
FIGS. 4A-4D are flowcharts illustrating exemplary processes for mitigating EMI of the victim receiver caused by the aggressor communications bus in the computing device of FIG. 3.

In this regard, FIG. 4A illustrates an exemplary process 86A for mitigating EMI of the victim receiver 54 caused by the aggressor communications bus 56 in the computing device 52 of FIG. 3. The process 86A includes receiving information from the coexistence manager 72, wherein the information is related to EMI of the victim receiver 54 as a result of the aggressor communications bus 56 (block 88). To determine the data/clock mode in this aspect, the process 86A includes receiving information indicating if the victim receiver 54 experiences EMI as a result of the aggressor communications bus 56 (block 90). Further, the process 86A includes determining the acceptable performance level of the victim receiver 54 (block 92). The process 86A also includes determining the data/clock mode to which to set the interfaces 62, 74 associated with the aggressor communications bus 56 to mitigate the EMI experienced by the victim receiver 54, and allow the victim receiver 54 to operate at or above the acceptable performance level (block 94). The process 86A also includes processing a determination of the data/clock mode of the interfaces 62, 74 that mitigates the performance impact corresponding to the EMI (block 96). Notably, other aspects may determine the data/clock mode using steps other than those described in blocks 90-96. As a non-limiting example, other aspects may not include block 94, and instead determine the data/clock mode in which to set the interfaces 62, 74 in the processing step of block 96.

With continuing reference to FIG. 4A, the process 86A includes setting the data/clock mode of the interfaces 62, 74 to mitigate the EMI (block 98). One way in which the process 86A may set the data/clock mode is by setting the data rate of one or more of the lanes 70(1)-70(6) associated with the interfaces 62, 74 to mitigate the EMI (block 100A). To set the data rate in block 100A, the process 86A may multiplex more than one of the application processor signals 64(1)-64(5) (or the transceiver signals 66(1)-66(5)) associated with more than one of the lanes 70(1)-70(6) associated with the interface 62 (or the interface 74) onto one of the lanes 70(1)-70(6) (block 102A). Alternatively, the process 86A may set the data rate in block 98 by demultiplexing one of the application processor signals 64(1)-64(5) (or the transceiver signals 66(1)-66(5)) associated with one of the lanes 70(1)-70(6) onto more than one of the lanes 70(1)-70(6) associated with the interface 62 (or the interface 74) (block 104A).

Figure 4B:
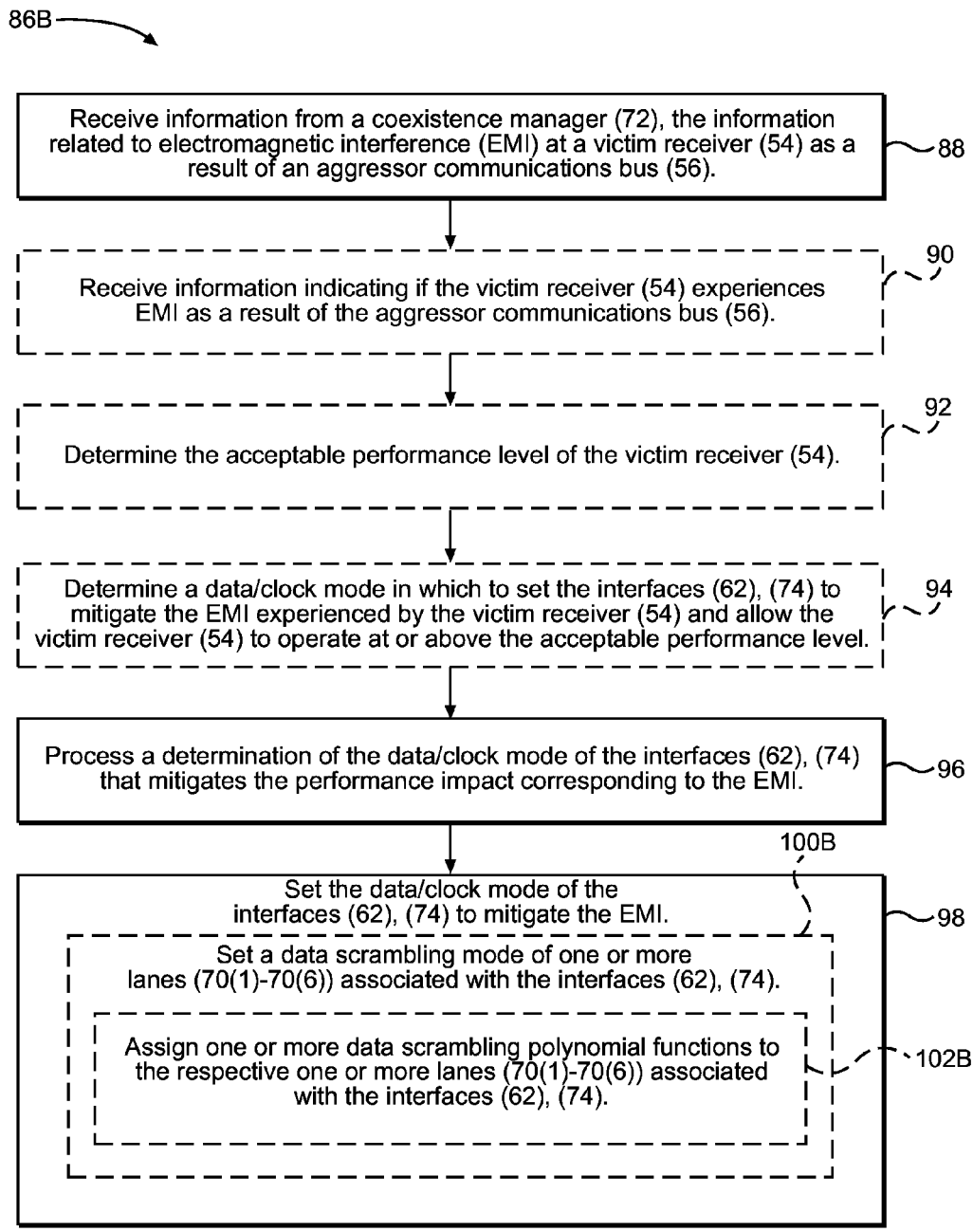
Figure 4C:
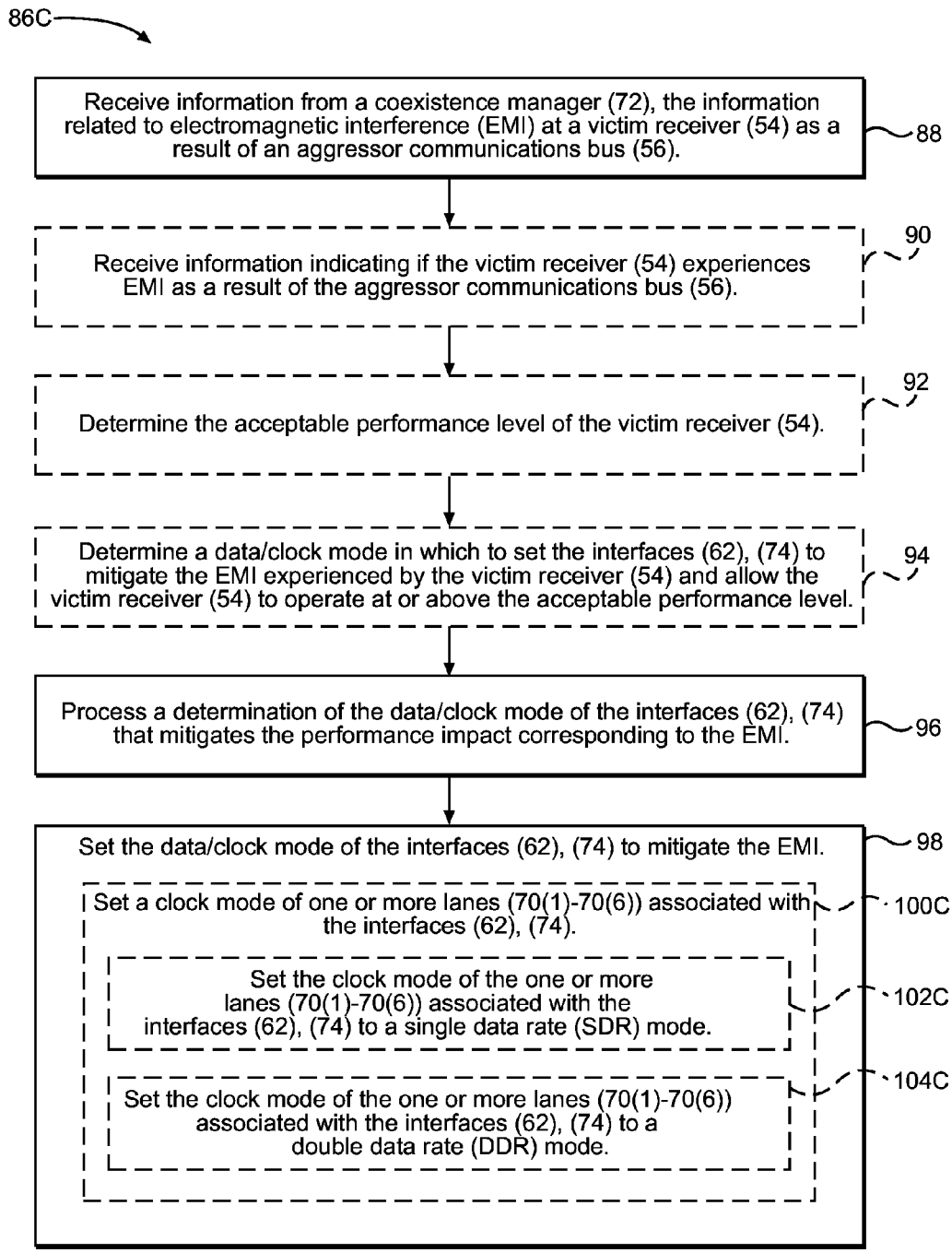
Figure 4D:
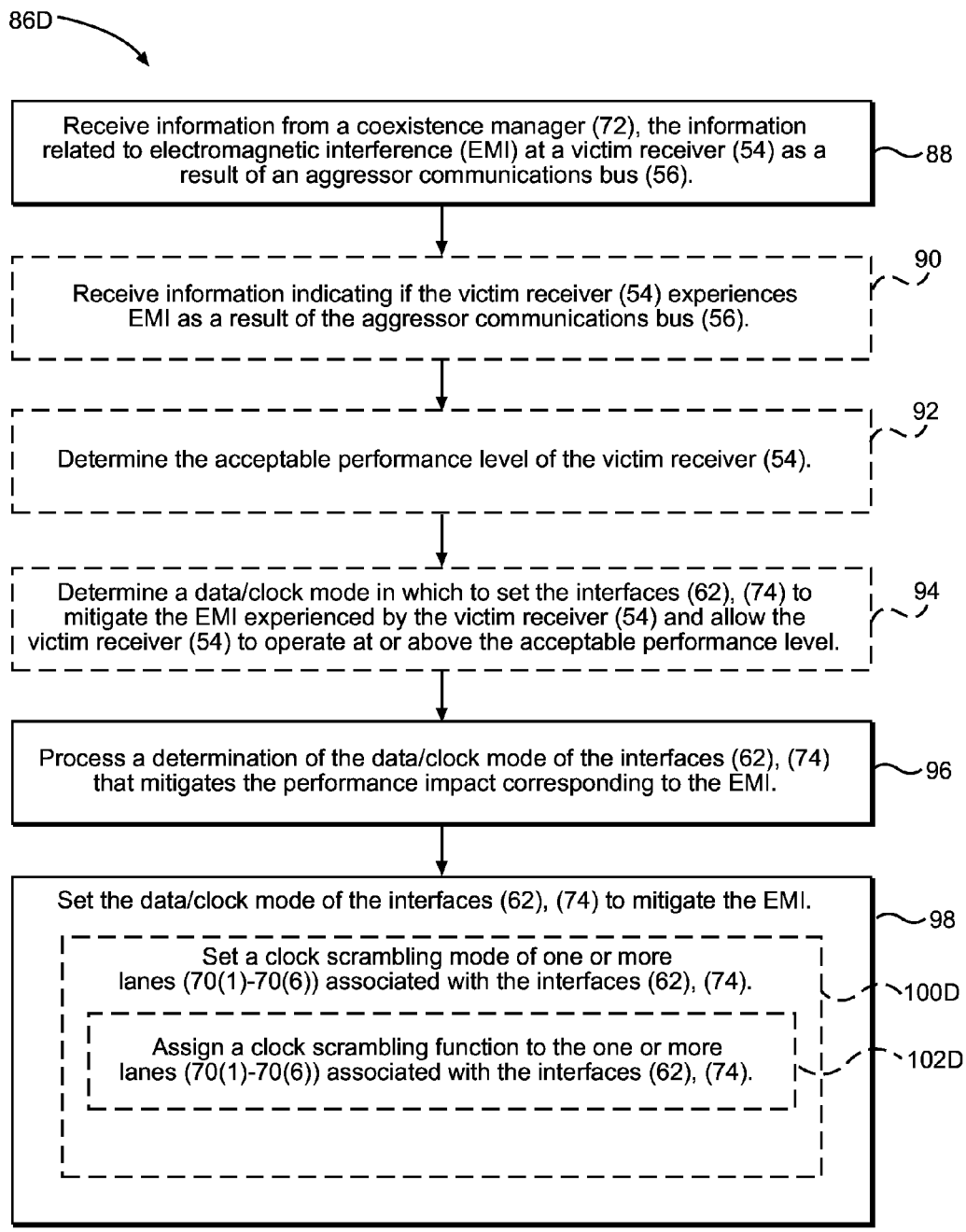

While the process 86A of FIG. 4A sets the data/clock mode by way of setting the data rate, alternative aspects may include processes that set the data/clock mode in other ways. FIGS. 4B, 4C, and 4D illustrate exemplary processes 86B, 86C, and 86D, respectively, for mitigating the EMI of the victim receiver 54 caused by the aggressor communications bus 56 in the computing device 52 of FIG. 3. The processes 86B, 86C, and 86D all include the same steps provided in blocks 88-98 of the process 86A of FIG. 4A. However, each of the processes 86B, 86C, and 86D include alternative ways of setting the data/clock mode in block 98.

In this manner, the process 86B in FIG. 4B may set the data/clock mode by setting a data scrambling mode of one or more of the lanes 70(1)-70(6) associated with the interfaces 62, 74 (block 100B). One way in which the data scrambling mode may be set is by assigning one or more data scrambling polynomial functions to the respective one or more lanes 70(1)-70(6) associated with the interfaces 62, 74 (block 102B).

Further, the process 86C in FIG. 4C may set the data/clock mode in block 96 by setting a clock mode of the lanes 70(1)-70(6) associated with the interfaces 62, 74 (block 100C). One way in which the clock mode may be set is by setting the clock mode of one or more of the lanes 70(1)-70(6) to a SDR mode (block 102C). Conversely, the clock mode may be set in the process 86C by setting one or more of the lanes 70(1)-70(6) to a DDR (block 104C).

Additionally, the process 86D may set the data/clock mode in block 96 by setting the clock scrambling mode of one or more of the lanes 70(1)-70(6) associated with the interfaces 62, 74 (block 100D). To set the clock scrambling mode, the process 86D may include assigning the clock scrambling function to one or more of the lanes 70(1)-70(6) associated with the interfaces 62, 74 (block 102D). Thus, the processes 86A-86D provide designers with additional tools that may reduce the performance degradation of the victim receiver 54 attributable to EMI.

Figure 5A:
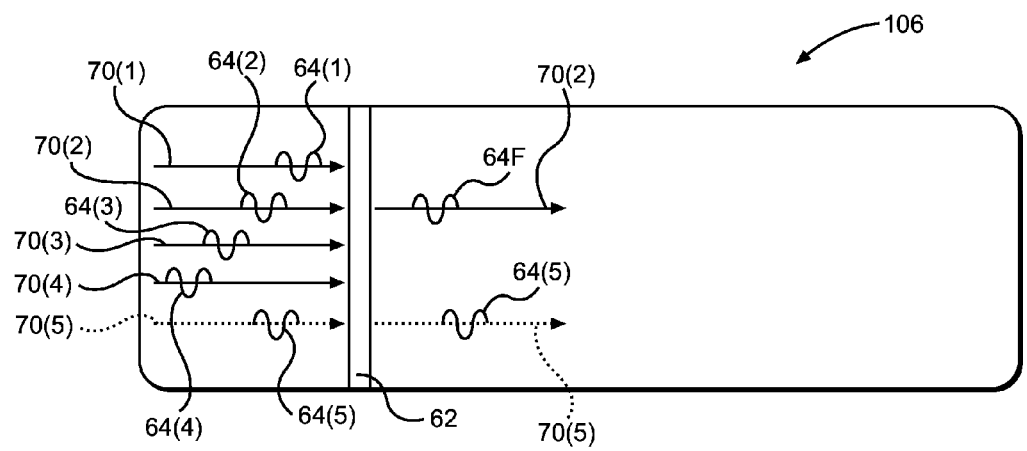
FIG. 5A is a diagram of multiple exemplary application processor signals associated with lanes of an aggressor communications bus multiplexed onto one lane.

Additional details of setting the data/clock mode as described in the above aspects are now provided. In this regard, FIG. 5A illustrates a diagram 106 of multiple exemplary application processor signals 64(1)-64(4) corresponding to the lanes 70(1)-70(4) of the aggressor communications bus 56 multiplexed onto the lane 70(2). In this example, the application processor signals 64(1)-64(4) are data signals (also referred to as the "data signals 64(1)-64(4)"), while the application processor signal 64(5) is a clock signal (also referred to as the "clock signal 64(5)"). Further, each data signal 64(1)-64(4) and the clock signal 64(5) has a data rate of A gigabits per second (Gbps), and the clock signal 64(5) has a clock rate of A Gbps. Notably, in other aspects, the data rate may be expressed in alternative units, such as in giga symbols per second (Gsym/s), or wherein the clock signal 64(5) has a frequency approximately equal to a symbol rate or a comparable embedded clock. As previously described, to set the data/clock mode associated with the interface 62 of the application processor 58, the data rate of the interface 62 may be set. One way to set the data rate of the interface 62 is to multiplex the data signals 64(1)-64(4) corresponding to the lanes 70(1)-70(4) onto the lane 70(2). Notably, when multiplexing the data signals 64(1)-64(4) in this manner, the clock signal 64(5) remains associated with the lane 70(5). Further, multiplexing the data signals 64(1)-64(4) onto the lane 70(2) causes a final data signal 64F (e.g., the combined data signals 64(1)-64(4)) to have a data rate equal to a summation of the data rate of each data signal 64(1)-64(4) (e.g., the combined data rate=4*A Gbps). Although not illustrated in FIG. 5A, the transceiver signals 66(1)-66(4) may be similarly multiplexed onto the lane 70(2) and achieve a similar data rate increase.

Figure 5B:
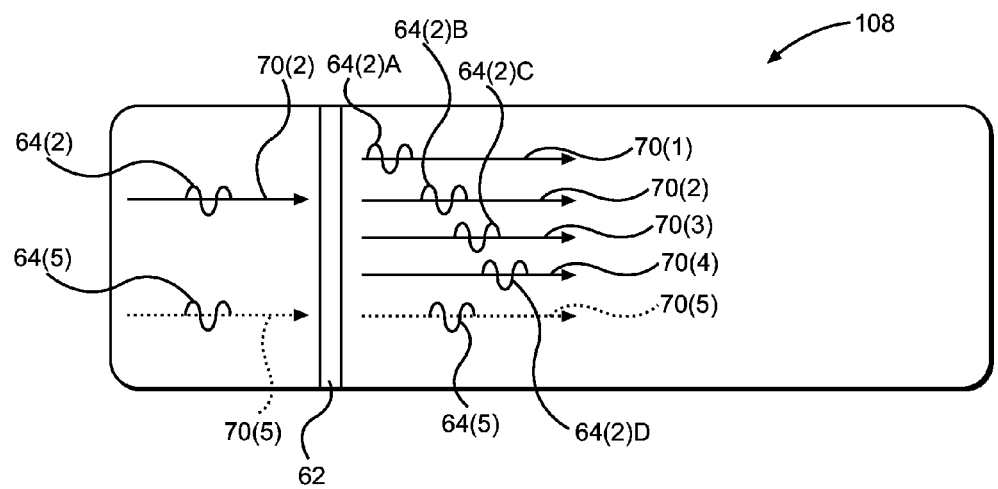
FIG. 5B is a diagram of one exemplary application processor signal associated with one lane of an aggressor communications bus demultiplexed onto multiples lanes.

In addition to setting the data rate via multiplexing, the data rate may be set by demultiplexing one of the data signals 64(1)-64(4) onto one of the lanes 70(1)-70(4). In this regard, FIG. 5B illustrates a diagram 108 of the data signal 64(2) corresponding to the lane 70(2) of the aggressor communications bus 56 demultiplexed onto the lanes 70(1)-70(4). Notably, the data signal 64(2) and the clock signal 64(5) have a data rate of B Gbps. When demultiplexing the data signal 64(2) in this manner, the clock signal 64(5) remains associated with the lane 70(5). Further, demultiplexing the data signal 64(2) onto the lanes 70(1)-70(4) causes each divided data signal 64(1)A-64(4)D to have a data rate equal to the data rate of the data signal 64(2) divided by the number of lanes 70(1)-70(4) onto which the data signal 64(2) is demultiplexed (e.g., the divided data rate of each divided data signal 64(1)A-64(4)D=A/4 Gbps). Although not illustrated in FIG. 5B, the transceiver signal 66(2) may be similarly demultiplexed onto the lanes 70(1)-70(4) and achieve a similar decrease in data rate.

In this regard, setting the data rate by multiplexing or demultiplexing the data signals 64(1)-64(4) in FIGS. 5A, 5B, respectively, may reduce the performance degradation of the victim receiver 54 attributable to EMI. Further, if setting the data rate as described in FIGS. 5A, 5B does not mitigate the EMI to a desirable level, the control systems 68, 76 may set the data/clock mode in additional ways to further reduced the performance degradation of the victim receiver 54. As previously described, the control systems 68, 76 may set the data/clock mode by setting the data or clock scrambling modes for corresponding lanes 70(1)-70(5) in addition to setting the data rate. Thus, aspects disclosed herein provide designers with multiple tools that may reduce the performance degradation of the victim receiver 54 attributable to EMI.

The aspects of dynamic interface management for interference mitigation according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An application processor, comprising:
an interface configured to:
couple to an aggressor communications bus;
transmit one or more application processor signals to the aggressor communications bus; and
receive one or more transceiver signals from the aggressor communications bus; and
a control system configured to:
receive information from a coexistence manager, the information indicating that a victim receiver experiences electromagnetic interference (EMI) as a result of the aggressor communications bus;

process a determination of a data/clock mode of the interface that mitigates a performance impact corresponding to the EMI; and
set the data/clock mode of the interface to mitigate the EMI experienced at the victim receiver.

2. The application processor of claim 1, wherein the control system is configured to process the determination of the data/clock mode by being configured to determine the data/clock mode to which to set the interface to mitigate the EMI experienced by the victim receiver.

3. The application processor of claim 1, wherein the coexistence manager is configured to:
receive the information indicating if the victim receiver experiences the EMI as the result of the aggressor communications bus;
determine an acceptable performance level of the victim receiver; and
determine the data/clock mode to which to set the interface to mitigate the EMI experienced by the victim receiver and allow the victim receiver to operate at or above the acceptable performance level.

4. The application processor of claim 1, wherein the information received from the coexistence manager comprises:
the information indicating if the victim receiver experiences the EMI as the result of the aggressor communications bus; and
an acceptable performance level of the victim receiver.

5. The application processor of claim 1, wherein the control system is configured to set the data/clock mode by being configured to set a data rate of one or more lanes associated with the interface to mitigate the EMI.

6. The application processor of claim 5, wherein the control system is configured to set the data rate of the interface by being configured to multiplex a plurality of application processor signals associated with a plurality of the one or more lanes associated with the interface onto one lane associated with the interface.

7. The application processor of claim 5, wherein the control system is configured to set the data rate of the interface by being configured to demultiplex one application processor signal associated with one lane of the one or more lanes associated with the interface onto a plurality of lanes of the one or more lanes associated with the interface.

8. The application processor of claim 1, wherein the control system is configured to set the data/clock mode by being configured to set a data scrambling mode of one or more lanes associated with the interface.

9. The application processor of claim 8, wherein the control system is configured to set the data scrambling mode by being configured to assign one or more data scrambling polynomial functions to the one or more lanes associated with the interface.

10. The application processor of claim 1, wherein the control system is configured to set the data/clock mode by being configured to set a clock mode of one or more lanes associated with the interface.

11. The application processor of claim 10, wherein the control system is configured to set the data/clock mode by being configured to set the clock mode of the one or more lanes associated with the interface to a single data rate (SDR) mode.

12. The application processor of claim 10, wherein the control system is configured to set the data/clock mode by being configured to set the clock mode of the one or more lanes associated with the interface to a double data rate (DDR) mode.

13. The application processor of claim 1, wherein the control system is configured to set the data/clock mode by being configured to set a clock scrambling mode of one or more lanes associated with the interface.

14. The application processor of claim 13, wherein the control system is configured to set the clock scrambling mode by being configured to assign a clock scrambling function to the one or more lanes associated with the interface.

15. The application processor of claim 1, wherein:
the one or more application processor signals comprise one or more data signals; and
the one or more transceiver signals comprise one or more data signals.

16. The application processor of claim 1, wherein:
the one or more application processor signals comprise one or more clock signals; and
the one or more transceiver signals comprise one or more clock signals.

17. The application processor of claim 1, further comprising the coexistence manager.

18. The application processor of claim 1, wherein the application processor receives the information from the coexistence manager positioned remotely from the application processor.

19. A method for mitigating electromagnetic interference (EMI) experienced by a victim receiver as a result of an aggressor communications bus, comprising:
receiving information from a coexistence manager, the information related to EMI at a victim receiver as a result of an aggressor communications bus;
processing a determination of a data/clock mode of an interface that mitigates a performance impact corresponding to the EMI; and
setting the data/clock mode of the interface to mitigate the EMI.

20. The method of claim 19, further comprising:
receiving, at the coexistence manager, the information indicating that the victim receiver experiences the EMI as the result of the aggressor communications bus;
determining an acceptable performance level of the victim receiver; and
determining the data/clock mode to which to set the interface to mitigate the EMI experienced by the victim receiver and allow the victim receiver to operate at or above the acceptable performance level.

21. The method of claim 19, wherein setting the data/clock mode comprises setting a data rate of one or more lanes associated with the interface to mitigate the EMI.

22. The method of claim 19, wherein setting the data/clock mode comprises setting a data scrambling mode of one or more lanes associated with the interface.

23. The method of claim 19, wherein setting the data/clock mode comprises setting a clock mode of one or more lanes associated with the interface.

24. The method of claim 19, wherein setting the data/clock mode comprises setting a clock scrambling mode of one or more lanes associated with the interface.

25. A transceiver comprising:
an interface configured to:
couple to an aggressor communications bus;
transmit one or more transceiver signals to the aggressor communications bus; and
receive one or more application processor signals from the aggressor communications bus; and a control system configured to:
   receive information from a coexistence manager, the information related to electromagnetic interference (EMI) at a victim receiver as a result of the aggressor communications bus;
   process a determination of a data/clock mode of the interface that mitigates a performance impact corresponding to the EMI; and
   set the data/clock mode of the interface to mitigate the EMI.

26. The transceiver of claim 25 integrated into a device selected from the group consisting of: a system-on-a-chip (SoC), a peripheral, and an electronic component that includes an interface to a bus.

27. The transceiver of claim 25, wherein the control system is configured to set the data/clock mode by being configured to set a data rate of one or more lanes associated with the interface to mitigate the EMI.

28. The transceiver of claim 25, wherein the control system is configured to set the data/clock mode by being configured to set a data scrambling mode of one or more lanes associated with the interface.

29. The transceiver of claim 25, wherein the control system is configured to set the data/clock mode by being configured to set a clock mode of one or more lanes associated with the interface.

30. The transceiver of claim 25, wherein the control system is configured to set the data/clock mode by being configured to set a clock scrambling mode of one or more lanes associated with the interface.

* * * * *